(12) United States Patent
Chiaramello et al.

(10) Patent No.: US 10,508,045 B2
(45) Date of Patent: Dec. 17, 2019

(54) PROCESS AND COMPOSITION FOR CONVERTING LIQUID HYDROCARBONS AND FATTY SUBSTANCES TO SOLID FORM, DEVICES FOR IMPLEMENTING THIS PROCESS AND MANUFACTURING THIS COMPOSITION, AND THE USE THEREOF FOR ENVIRONMENTAL REMEDIATION

(71) Applicant: CALUDE SARL, Luxembourg (LU)

(72) Inventors: Jean-Marc Chiaramello, Nice (FR); Claude Bertrand, Taradeau (FR)

(73) Assignee: CALUDE SARL, Luxembourg (LU)

( * ) Notice: Subject to any disclaimer, the term of this patent is extended or adjusted under 35 U.S.C. 154(b) by 722 days.

(21) Appl. No.: 14/786,612

(22) PCT Filed: Apr. 24, 2014

(86) PCT No.: PCT/EP2014/058296
§ 371 (c)(1),
(2) Date: Feb. 29, 2016

(87) PCT Pub. No.: WO2014/173988
PCT Pub. Date: Oct. 30, 2014

(65) Prior Publication Data
US 2016/0185621 A1 Jun. 30, 2016

(30) Foreign Application Priority Data
Apr. 24, 2013 (EP) ..................................... 13305537

(51) Int. Cl.
*C02F 1/40* (2006.01)
*C02F 1/28* (2006.01)
*C09K 3/32* (2006.01)
*E02B 15/04* (2006.01)
*C02F 101/32* (2006.01)

(52) U.S. Cl.
CPC ................ *C02F 1/281* (2013.01); *C02F 1/40* (2013.01); *C09K 3/32* (2013.01); *E02B 15/041* (2013.01); *C02F 2101/32* (2013.01); *Y02A 20/204* (2018.01)

(58) Field of Classification Search
CPC ....................................................... C02F 1/281
See application file for complete search history.

(56) References Cited

U.S. PATENT DOCUMENTS

| | | | | |
|---|---|---|---|---|
| 3,849,246 A * | 11/1974 | Raymond | ................. | B03B 9/06 |
| | | | | 162/189 |
| 4,222,868 A | 9/1980 | Kuris | | |
| 4,276,179 A * | 6/1981 | Soehngen | .............. | A23C 7/043 |
| | | | | 208/262.5 |
| 5,049,002 A | 9/1991 | Cole | | |
| 5,112,495 A | 5/1992 | Bartha et al. | | |
| 7,147,779 B1 * | 12/2006 | Phifer | ..................... | C02F 3/345 |
| | | | | 210/610 |
| 7,531,600 B1 * | 5/2009 | Rey | .......................... | C02F 1/56 |
| | | | | 210/698 |
| 2012/0018385 A1 | 1/2012 | Broberg et al. | | |
| 2012/0066965 A1* | 3/2012 | Ruwwe | .................. | C07C 67/03 |
| | | | | 44/403 |

FOREIGN PATENT DOCUMENTS

| | | |
|---|---|---|
| AU | 33547 78 | 8/1979 |
| DE | 40 12 638 | 10/1991 |
| DE | 20 2005 010806 | 11/2006 |

OTHER PUBLICATIONS

International Search Report for PCT/EP2014/058296 dated Jun. 4, 2014.

* cited by examiner

*Primary Examiner* — Peter Keyworth
(74) *Attorney, Agent, or Firm* — B. Aaron Schulman, Esq.; Stites & Harbison, PLLC

(57) ABSTRACT

Process and device for converting hydrocarbons or fatty substances that are in substantially liquid form to solid form, especially for the environmental remediation of surfaces or sites polluted by these hydrocarbons or fatty substances, characterized in that the material to be converted to solid form is brought into contact with a composition heated to the liquid state, comprising, at least in the majority proportion, tallow, and optionally a fluidizing agent, thus obtaining a solid complex material, that is easy to collect, and that can be reprocessed in order to recover the material.

14 Claims, 14 Drawing Sheets

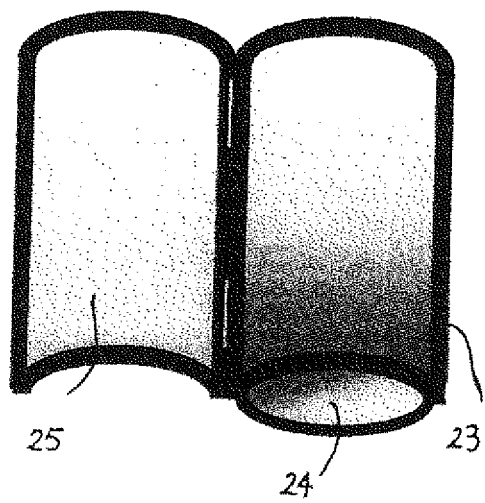
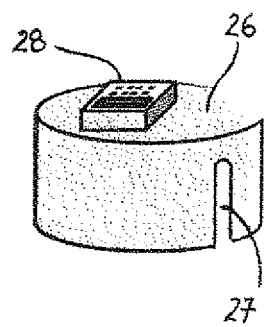
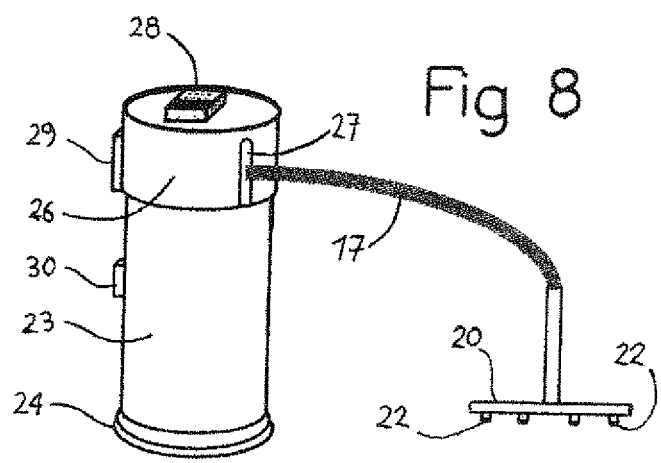

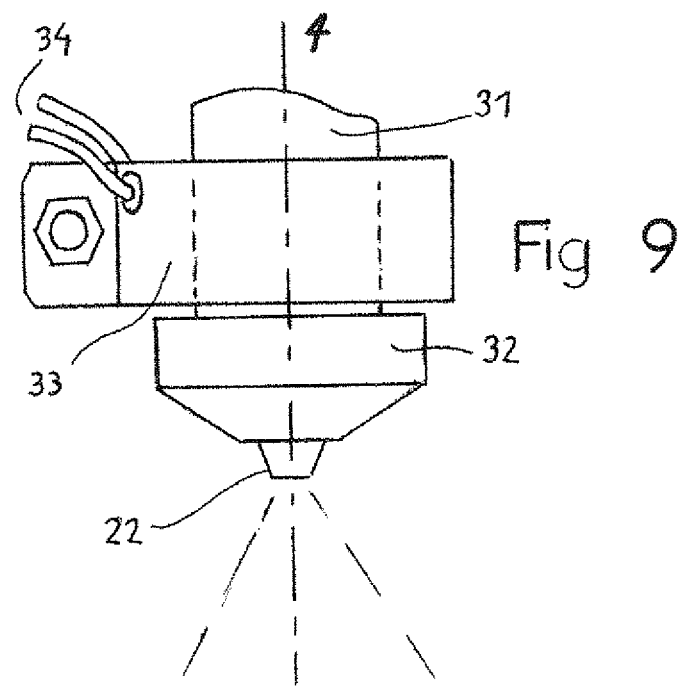
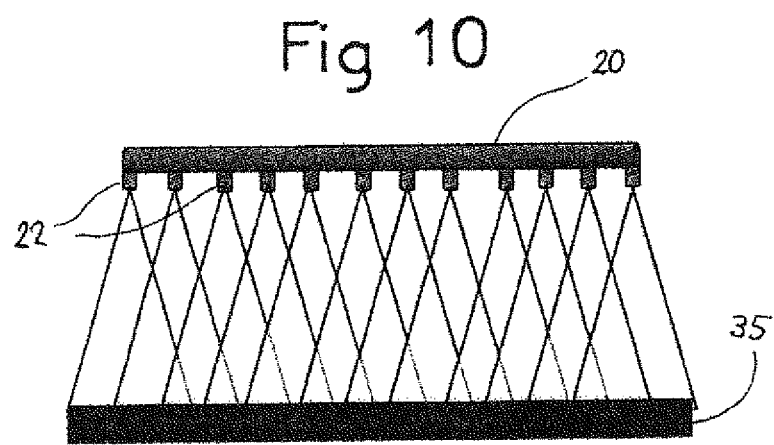

Fig 13
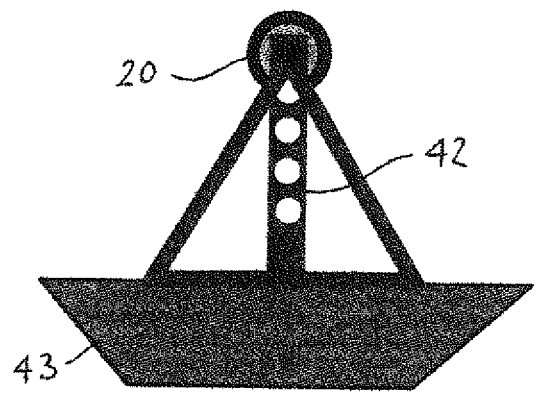
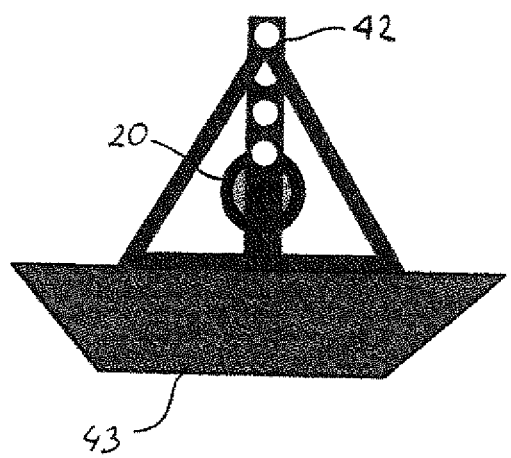

Fig 15
Fig 16
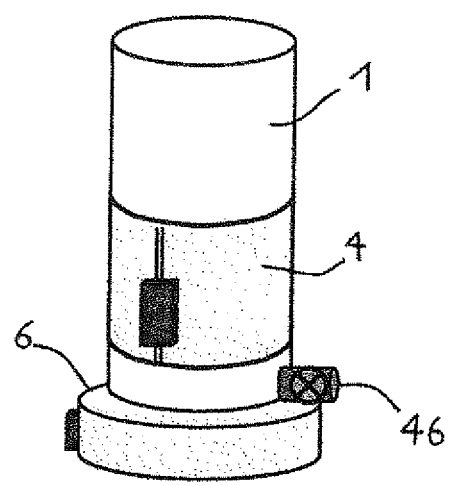
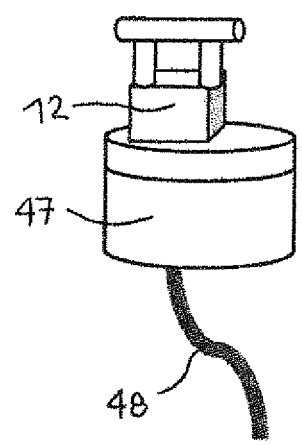

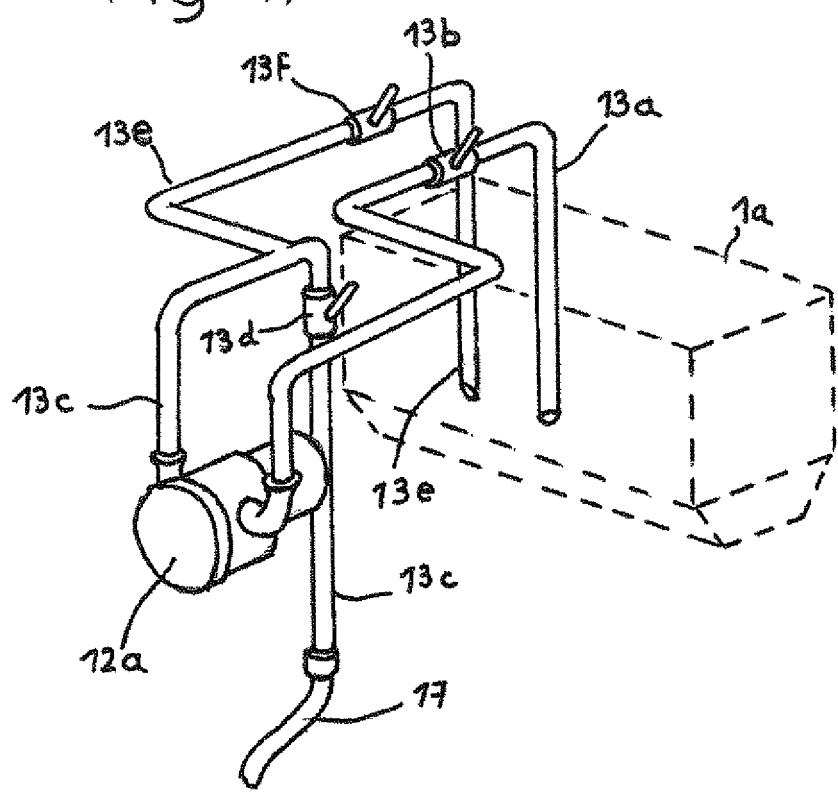

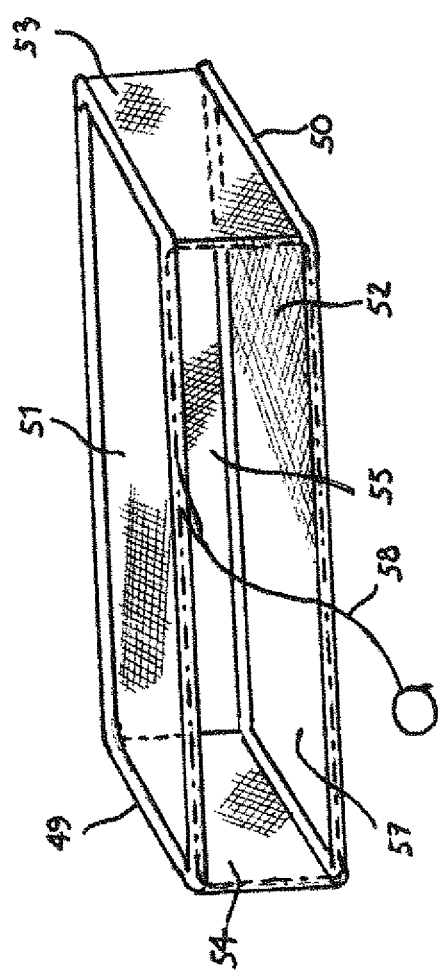

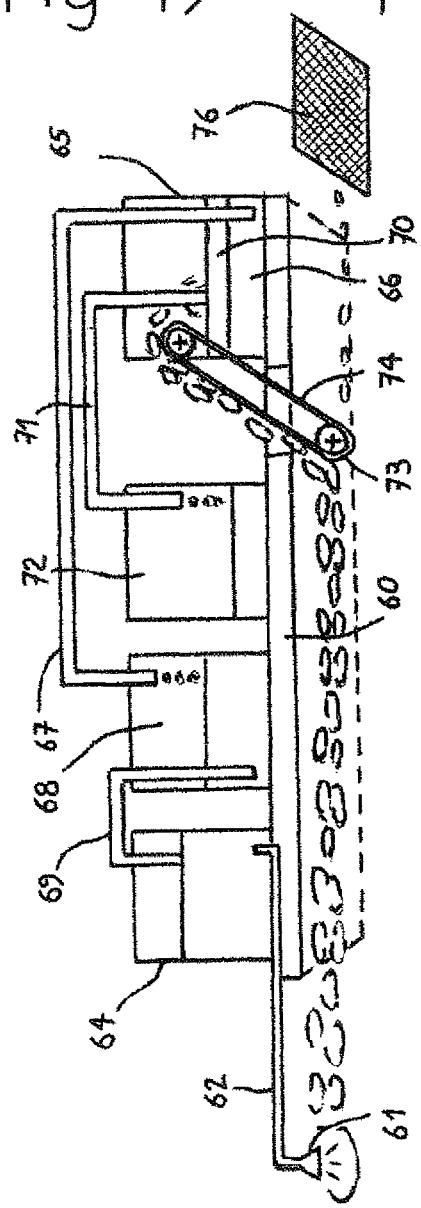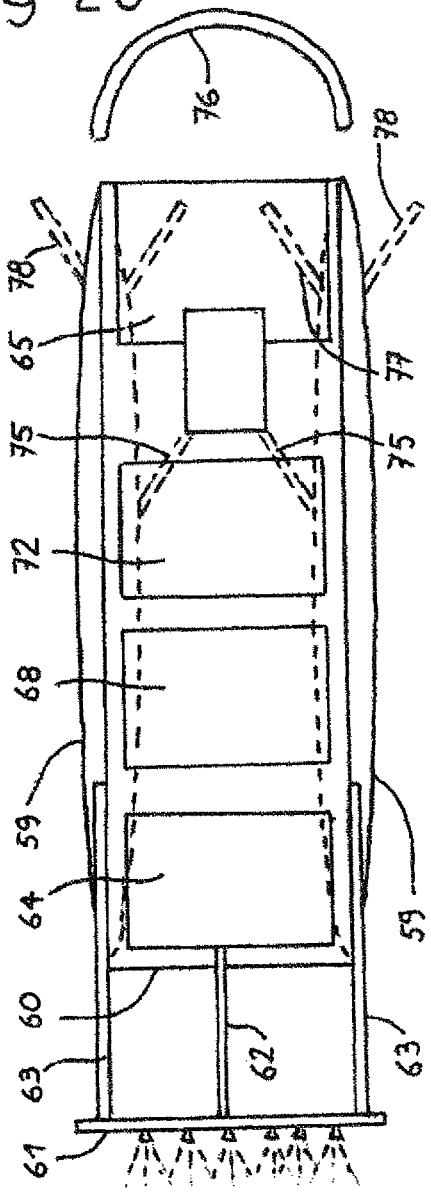

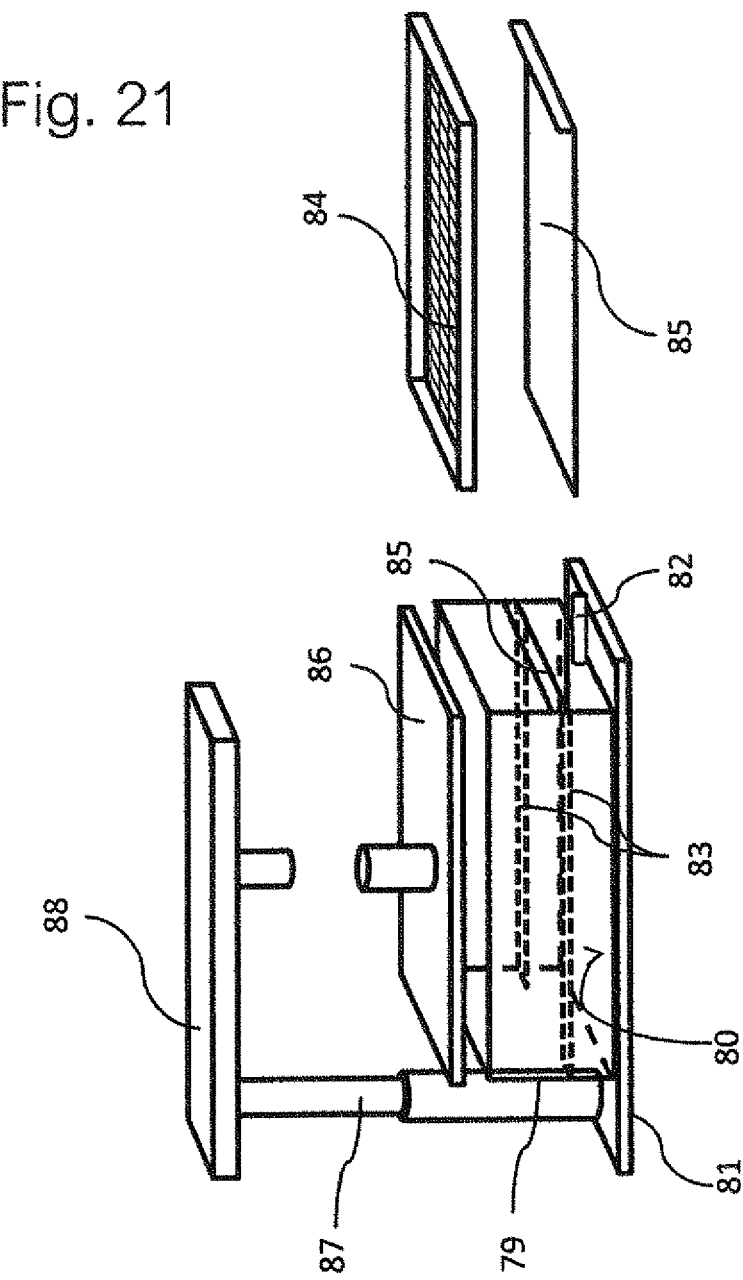

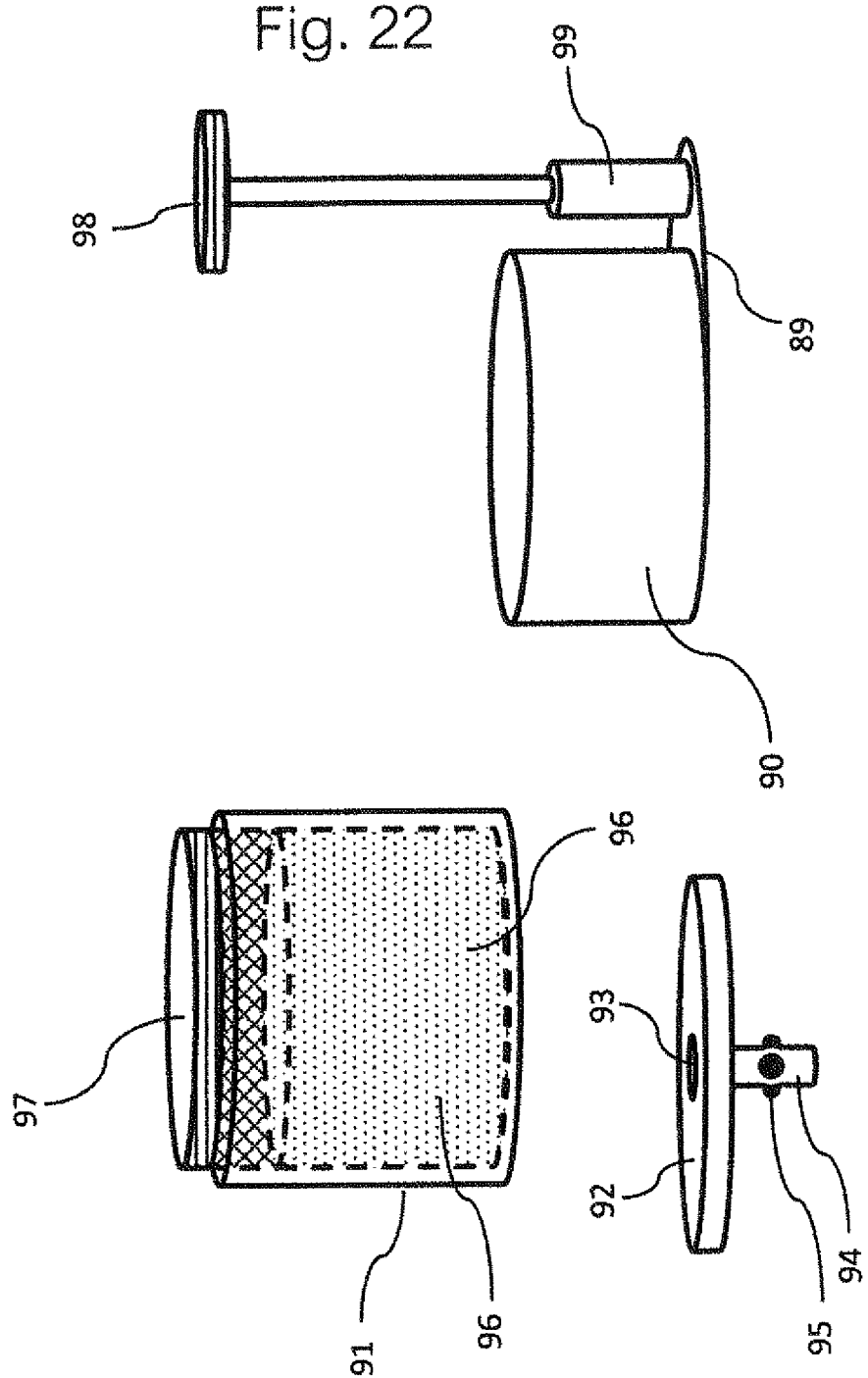

PROCESS AND COMPOSITION FOR CONVERTING LIQUID HYDROCARBONS AND FATTY SUBSTANCES TO SOLID FORM, DEVICES FOR IMPLEMENTING THIS PROCESS AND MANUFACTURING THIS COMPOSITION, AND THE USE THEREOF FOR ENVIRONMENTAL REMEDIATION

The present invention concerns a process allowing the conversion of liquids such as hydrocarbons or fatty substances to solid form, in particular when spilled over solid or aqueous surfaces, and devices for implementation thereof.

Various means have already been proposed for the remediation of such spills and in particular confining and collecting means. On account of the liquid form of these pollutants, means have also already been proposed intended for solidification thereof to facilitate their recovery.

It has already been proposed to absorb these liquid pollutants with absorbent products. For example, patent EP-A-1341620 proposes absorbing these liquid pollutants with absorbent products. It has been proposed to absorb hydrocarbons, including at aquatic sites, with dehydrated preparations of peat and all kinds of absorbents have already been envisaged.

All these products are voluminous and difficult to apply over polluted sites. On aquatic surfaces they may become hydrated and finally entrain the agglomerate of pollutants down to the water bed.

According to another approach, it has already been proposed to solidify hydrocarbons with polymerizing or gelling chemical agents. For example patent FR-A-2806939 proposes solidifying liquid hydrocarbons through the use of chemical products such as peroxides. Other agents are envisaged e.g. in patent FR-A-1026092 for solidification via gelling. Indeed, a plurality of such polymerizing or gelling agents has been proposed. Many have the drawback of being solid particles.

Patents DE-A-4012638, U.S. Pat. No. 5,112,495 and AU-78/33547 have already proposed solidifying hydrocarbons by pouring heated candle wax or paraffin on the layer of hydrocarbons then collecting the solidified mixture from which the wax or paraffin can possibly be separated for recycling These products are themselves polluting however in particular for aquatic animals.

U.S. Pat. No. 5,049,002 suggested removing oil products from an aqueous environment by pouring a fat on the product to be removed, such as dairy butter or shortening in the molten state, to obtain setting in a solid mass. The solidification time is very lengthy and highly sensitive to the temperature of the water. In addition, a substantial proportion of the oil product is not recovered.

An important study on the properties of numerous solidifying agents was published by Ghalambor, A. 1997: The effectiveness of solidifiers for combatting oil spills, Louisiana Applied Oil Spill Research and Development Program, OSRADP Technical Report Series 96-006. The conclusion was major inconsistency in results not to mention disadvantages due to the chemical nature of the solidifiers in a natural environment.

The obtaining, conveying and application of these chemical products raise numerous risks in addition to risks of residual pollution originating from these products themselves. The present invention proposes overcoming these shortcomings and to provide a process and composition allowing instant solidification of slicks of hydrocarbons or fatty substances, if need be on large surface areas, in a manner which allows easy removal in particular for the treatment of polluted surfaces. It also proposes allowing even very large surface areas to be treated including maritime surfaces with comparatively very small amounts of this composition. It allows such treatments to be carried out ecologically. It also allows the subsequent separation of the pollutant from the material of the composition for re-use thereof.

The subject of the invention is a process for converting substantially liquid hydrocarbons or fatty substances to solid form, in particular for remediation of surfaces or sites polluted with these hydrocarbons or fatty substances, characterized in that the matter to be converted to solid form is contacted with a composition in the liquid state, in particular via heating, comprising tallow at least in majority proportion, solid at ambient temperature, and optionally a fluidizing agent.

In one particularly preferred embodiment, immediately before said contacting, a step is performed to prepare the matter to be solidified thereby improving the distribution of said composition within the matter.

This step preferably comprises sprinkling with an acid in particular a short-chain organic acid, preferably citric acid or acetic acid. Other usual acids can also be used however, such as sulfuric acid for example.

Preferably the acid is used at usual commercial concentrations.

The acid flow rate is low compared with the flow rate of the composition. Preferably the volume of poured acid is 10% or less of the total volume of the composition used e.g. in the order of 2 to 4%.

In another embodiment this step may comprise the jetting of a compressed gas, in particular compressed air onto the matter to be solidified. Preferably very fine jets of compressed air are used. In another embodiment this step may comprise mechanical separation, for example using blades or other mechanical means drawn through said matter. These other embodiments can also be associated with the sprinkling of acid.

This preparation step of the matter to be converted to solid form can advantageously be implemented in a zone at a short distance ahead of the contact zone between the matter and composition in liquid form, in relation to the direction of relative travel of the matter e.g. a hydrocarbon slick and the contacting means. Preferably the distance between the two zones is 5 cm to 1 m, more preferably between 15 and 50 cm.

Advantageously the liquid state of said composition can be obtained by heating solid tallow to or above its melting point higher than ambient temperature, or by heating the composition itself preferably to a temperature of at least 45° C., for example between 48 and 55° C., even higher e.g. 60 and 80° C.

A further subject of the invention is said composition and use thereof to convert substantially liquid hydrocarbons or fatty substances to solid form, in particular for the remediation of surfaces or sites polluted by these hydrocarbons or fatty substances, the composition comprising tallow at least in majority proportion and optionally a fluidizing agent.

In one embodiment, said composition can be mixed with an amount of hydrocarbon or fatty substance taken from the pollution for example, this amount able to act as lubricating agent either in addition to or instead of a specific lubricating agent, the proportion of hydrocarbon or fatty substance in the mixture not exceeding a value which would prevent the tallow, in the liquidized mixture, from solidifying an additional quantity of hydrocarbon or fatty substance onto which the liquid mixture is applied.

The tallow is obtained by melting cattle fat, beef fat in particular, or ovine fat, particularly sheep fat. The melting point of tallow is in the order of 48 to 50° C.

Said material solid at ambient temperature, which forms the entirety or majority of the composition, is fully and rapidly biodegradable in each of the environments in which the composition is used.

By majority proportion is meant a volume proportion relative to the total composition of at least 50%, preferably at least 75%, and more preferably at least 90%, even 100% in the absence of any fluidizing agent.

The fluidizing agent optionally contained in the composition has the role of adjusting the fluidity of the composition to facilitate the flowing thereof, if necessary, when it is contacted with the matter to be converted to the solid state.

This agent may be a usual surfactant e.g. a polysorbate or Tween. However preference is given to oil preferably a mineral oil. It may also be polluting oil, e.g. spent engine oil, since it will be fully solidified and collected with the process of the invention. The proportion of this agent, oil in particular, is preferably 5 weight % or lower, and more preferably in the order of 1 to 2%, even less.

The composition may possibly contain a minority amount of a material, in particular to increase the density of the composition, optionally in the form of solid particles e.g. iron dust but it is preferred that it essentially contains tallow. The presence of iron dust may facilitate recovery of the complex material obtained after treatment, for example by using magnets or electro-magnets.

For manufacture of the composition, the constituents thereof, if several, can be heated to above the melting point of said tallow and the other optional components can be mixed therewith, but it also sufficient solely to heat said tallow to make it liquid and to add any other possible component unheated provided the temperature of the tallow is sufficient to maintain the whole composition in the liquid state.

If the fluidizing agent is present, it may or may not be heated and mixed with said material made liquid.

This production can take place before use of the composition to implement the process of the invention, in which case the composition is held at the high temperature preferably under agitation.

However it is also possible to produce the hot composition almost at the time of use thereof.

By hydrocarbons in the meaning of the present invention is meant, alone or in a mixture, aliphatic and/or aromatic hydrocarbons, saturated or unsaturated, liquid at ambient temperature and in particular but not limited thereto crude oils, condensates or pentane plus, hydrocarbon residues, extra-heavy oils or fluid syncrudes, fuel-oils or mineral oils, refined oils, fuels, petrol, diesel oil and synthetic hydrocarbons.

By fatty substances liquid at ambient temperature are meant, but not limited thereto, triglycerides, vegetable or animal oils, fats and fatty acids that are not or only scarcely water-soluble.

With regard to these hydrocarbons or fatty substances liquid at ambient temperature, by liquid is meant not only a fully fluid state but also more paste-like states nevertheless having a spontaneous tendency to spread over a solid or aquatic surface.

In general, this matter to be solidified has a density lower than 1 enabling it to float if on water, but this density may be higher if the matter is directly accessible to the composition of the invention.

By conversion of this matter to solid form is meant the forming of a complex material containing said matter e.g. a hydrocarbon or fatty substance, and at least the tallow, this solid complex material being able to be handled or collected and thereby to be fully separable from the solid or aquatic surface on which said matter is spilled, with the possible exception of the portion of matter which might have been absorbed or otherwise removed in the event that said matter lies on a solid surface that is porous or cracked or otherwise impregnatable. The process can even be performed on loose materials if they are saturated.

When the composition used contains a lubricating agent, of oily type in particular, it is possible and preferable to make provision so that this agent is also retained by the complex material thereby allowing removal thereof from the treated surface when collecting said complex material.

In one preferred improvement of the invention, once the solid complex material has been removed, it can be heated to a temperature equal to or higher than the melting point of the tallow of the composition of the invention, and the tallow can be separated preferably by simple decanting from the hydrocarbons or fatty substances and optionally from the oily lubricating agent. For this separation it is possible merely to draw off the superimposed liquids or to lower the temperature to solidify said material that is solid at ambient temperature and evacuate the phase(s) that have remained liquid.

As a variant, in particular when the hydrocarbon and tallow have close densities, it is possible to carry out this separation by simply pressing or centrifuging said heated complex material.

In particularly preferred manner in this embodiment, the collected solid complex material is heated to a temperature to soften this material, lower than the tallow melting point, preferably to a temperature of 30 to 38° C., more preferably in the order of 37° C., and the liquid hydrocarbon or fatty substance is separated by pressing against a filter or by centrifugation.

When pressing, the hydrocarbon or fatty substance passes through the filter thereby retaining the softened tallow. Preferably the filter has a small mesh size, smaller than 1 mm. It may advantageously be composed of a very fine wire mesh or a woven textile sheet, e.g. in linen, resting on reinforcing meshwork.

When centrifuging, preferably with vertical rotation axis, the softened tallow has a tendency to press against the wall of a centrifuge tank, the liquid hydrocarbon or fatty substance flowing downwards under gravity into the central space left free by the tallow. Rotation of 300 to 500 rpm is sufficient.

The recovered tallow has a residual content of hydrocarbon or fatty substance which may be lower than 1% and even lower than 0.5%.

The tallow can then be reused to produce a new quantity of composition of the invention which can again be used for the process of the invention.

The recovered matter i.e. the hydrocarbons or fatty substances can also possibly be reused.

A further subject of the invention is the application of the solid conversion process to the remediation of land or aquatic sites covered with a continuous or fragmented, more or less liquid slick of hydrocarbon or fatty substance.

In said remediation process an amount of the composition of the invention heated to the liquid state is applied to the spill, the solid formation obtained is collected and optionally at least the tallow is separated via heating from the hydrocarbons or fatty substances of the spill.

Preferably, if it is a major spill, the tallow is reused to produce a further amount of composition, preferably on site, which can be applied to continue remediation.

In one particularly preferred embodiment, on the matter to be solidified e.g. slick of hydrocarbon or fatty substance, an excess amount of composition is applied namely an amount that is distinctly higher and even several times higher than the minimum amount needed to solidify a quantity of matter to be solidified, the formed solid mixture is collected and this mixture is heated so that it becomes liquid and the treated mixture is again applied to another quantity of matter to be solidified, the newly formed solid mixture is again collected and optionally this operation is renewed one or more times if the last mixture to be formed remains capable, once heated and applied, of solidifying a further quantity of matter to be solidified.

The mixture of the invention can therefore be reused one or more times, mixed with polluting hydrocarbon or fatty substance to ensure substantially complete removal of the pollutant.

This embodiment is particularly useful if it is desired to continuously treat spills of small thickness or large surfaces of hydrocarbon or fatty substance. In this case said amount in excess is applied to a first surface of the slick, the formed solid mass is collected, made liquid and applied to another preferably adjacent surface of the slick and optionally the operation is repeated one or more times.

Preferably an amount 2 to 10 times in excess is used, more preferably at least 4 times in excess for the consecutive treatment of 2 to 10 surfaces of the slick.

Preferably the composition is applied by spreading, preferably via sprinkling or spraying so that it is brought into contact with the slick at a large number of points, typically little distant from one another or even in continuity over the treated surface.

Preferably sprinkling is carried out using nozzles at a height varying between 15 cm and 1 m, in particular between 30 and 60 cm.

The ejection pressure may advantageously be in the order of 2 to 6 bars.

If, as is particularly preferred, a step is performed to prepare the matter to be solidified, the application of acid can be carried out preferably in the form of fine, powerful jets for example at a pressure in the order of 2 to 6 bars, for example at a height of 15 cm to 1 m. If jets of compressed air are used it is preferred for these to be applied at a pressure for example in the order of 4 to 12 bars, for example at a height between 15 cm and 1 m. It is thus possible to solidify then collect spills possibly having a thickness of several centimetres even 10 cm or more.

It is also possible to implement the remediation process of the invention on slicks on which an agglomerating or absorbent material has already been applied e.g. dry peat, but it is generally preferred to apply the process to slicks without using any other material.

The solidified slick is collected preferably continuously during the solidification step. At sea or on an aquatic surface advantageous use can be made of nets and/or collecting means e.g. buckets or angled conveyor belts of which the lower end is immersed. It is preferable, as is usual practice, to confine the slick with floating booms. On a land surface, usual collecting means can be used e.g. excavators or bulldozers.

In one improvement on the remediation process, in particular for slicks of large surface area, it is possible continuously to convert said substantially liquid hydrocarbon or fatty matter to solid form by application of said composition, to collect said solid complex material thus formed, to separate at least the tallow from the collected hydrocarbons or fatty substances via heating, to re-manufacture said liquid composition from said separated material and to re-apply said remanufactured composition.

In the preferred case in which the composition in excess is reused several times to solidify successive quantities or surfaces of hydrocarbons or fatty substances, said separation step is performed on the composition which may finally have a high content e.g. 10%, even a saturating content e.g. 20 to 30% of hydrocarbons or fatty substances.

In addition, the efficacy of separation increases with the content of hydrocarbons or fatty substances, and it is possible not to carry out substantially complete separation of the tallow from these pollutants which can remain in the solution up to a proportion preferably not exceeding 0.5 to 2%.

A further subject of the invention concerns devices and the use thereof allowing implementation of the process of the invention and its applications.

It relates in particular both to a device and to use thereof to carry out the process of the invention for the conversion of substantially liquid hydrocarbons or fatty substances to solid form, characterized in that it comprises a tank able to contain a volume of composition of the invention in the liquid state, means to pour this composition and means for transfer thereof from the tank to said pouring means.

In one advantageous embodiment said tank may itself contain means to manufacture said composition in the liquid state. These means may in particular comprise means to heat the content of said tank, and preferably agitation means in particular to mix the molten tallow with a lubricating liquid and/or to ensure homogenization of the composition.

Preferably the pouring means comprise at least one nozzle to spray or sprinkle the liquid composition onto the contact zone with the matter to be solidified. Preferably said means comprise a plurality of nozzles arranged on a spreading ramp (spray boom).

Said means to transfer the composition may comprise one or more flexible or rigid tubes or pipes extending between said tank and said pouring means, and means e.g. pumping means or means to pressurize the tank to transfer said liquid composition under pressure.

It is particularly preferred permanently to hold said transfer means at a temperature at which the composition remains well liquid, and it is also preferred that the pouring means e.g. nozzles should be heated.

Preferably the tank is heat-insulated e.g. by peripheral insulating cladding. The tank heating means are preferably positioned outside the tank and formed for example by a heating jacket advantageously underneath the insulating cladding. It is also possible for example to use double-walled tanks, oil being circulated or heated between the walls to ensure heating and maintaining of temperature over long periods.

Preferably, the heat of the tank or vessel itself can maintain the temperature of the pumping means and agitation means.

The maintaining of the temperature of the tubes or pipes is preferably ensured by heating cables preferably secured inside insulating cladding of the tubes.

The maintained temperature of the nozzles can be ensured by heating collars for example surrounding the nozzles.

In the preferred embodiment in which a step is performed to prepare the matter to be solidified using an acid, the device also comprises a tank for this acid, pouring means and transfer means to deliver the acid under pressure. Preferably these pouring means comprise one or more nozzles. The positioning of these means can be adjusted in relation to the nozzle ramp used for the composition and/or, preferably and, can be adjusted height-wise in relation to the surface to be treated.

For example, these nozzles for the acid can be fixed on a ramp that can be secured to the ramp for pouring the composition, the two ramps being arranged so that the acid spreading area lies slightly ahead of the composition spreading area so that, as the device travels, the composition is immediately poured to the liquid matter that has just been sprinkled with acid.

The same applies if the action of acid is replaced by jets of compressed air.

A further subject of the invention is a device to implement the improved embodiment in which, after solidification of the material, the tallow of the composition is recovered by heating, this device being characterized in that it comprises a tank to receive the solidified complex assembly of matter and tallow, means to heat this assembly to form superimposed separated liquid phases of matter such as hydrocarbon or fatty substance, and the tallow, optionally cooling means if it is desired to solidify said material and separate transfer means for the two superimposed volumes.

In another embodiment this device, instead of a decanting tank, may comprise a centrifuge allowing the material such as tallow to be separated from the other phase or phases. The centrifuge may be of disc stack type, for example the one manufactured by Alfa Laval. It may also be of simple form with a cylindrical container or of vertical revolution that can be driven in rotation and having an evacuation orifice in the centre of its lower wall optionally with shutter means or a valve, said container being associated with means to heat to tallow softening temperature.

In yet another embodiment, this device may comprise a press device comprising a container or tank to receive the collected complex material, associated with heating means to tallow softening temperature, with pressurizing means inside the tank, one of the walls of the tank preferably the lower wall having a fine filter adapted to retain the pressurized softened tallow whilst allowing the liquid hydrocarbon or fatty substance to pass.

The device to implement the process of the invention to convert substantially liquid hydrocarbons or fatty substances to solid form can be of reduced size so that it can be transported by an operator but it is preferable, at least for major pollutions, that it should be mounted on board a suitable vehicle so that it can be taken directly to the site to be remediated.

For example this vehicle may be a truck, trailer or all-terrain vehicle or a floating craft e.g. a pontoon mounted on floats or a vessel preferably having at least two hulls, the assembly formed by the device and the vehicle possibly containing or not means to collect the formed solid and/or storage means for subsequent evacuation of the collected solid.

Advantageously said assembly may comprise additional containers for reserves of the composition.

For very large even very major pollutions, in particular aquatic pollutions, provision can be made so that the same vehicle e.g. a vessel also carries the device to recover the material of the composition, this material being immediately recovered and reused whilst the separated liquid pollutant is stored or evacuated.

It is even possible to make provision for an assembly in continuous operation, in which the animal fat material is immediately added back to the device implementing the process of the invention.

In general it is preferable to confine the slicks before remediation, in particular on aquatic surfaces, using usual confinement booms.

Other advantages and characteristics of the invention will become apparent on reading the following description given as a non-limiting example with reference to the appended drawings in which:

FIG. 1 gives a schematic view of the tank of a container to manufacture a composition of the invention, and its separate heating elements.

FIG. 2 gives a schematic view of this tank with its assembled heating elements.

FIG. 3 gives a schematic view of the lid-forming part of this tank.

FIG. 4 gives a schematic view of the container formed by the tank with its lid.

FIG. 5 gives a schematic view of the container provided with a flexible transfer conduit, and separate pour ramp.

FIG. 6 gives a schematic view of the insulating cladding of the tank.

FIG. 7 gives a schematic view of an upper cover with control means.

FIG. 8 gives a schematic view of the heat-insulated assembly.

FIG. 9 gives a schematic view of a nozzle to pour (spray) the composition.

FIG. 10 gives a schematic view of a nozzle ramp.

FIG. 11 gives a schematic view of a nozzle ramp at another height and at another spreading angle.

FIG. 12 gives a schematic view of an associated acid-spraying preparation device.

FIG. 13 is a schematic profile view of a composition pour ramp with float.

FIG. 15 gives a schematic view of a tank of a device to recover the material of the composition.

FIG. 16 gives a schematic view of a lid for this recovery tank.

FIG. 17 gives a schematic view of a container for use of large volumes of composition of the invention.

FIG. 18 gives a schematic view of a collecting net of a device of the invention.

FIG. 19 is a schematic profile view of an improved assembly for continuous remediation of a hydrocarbon slick of large surface area on an aquatic site.

FIG. 20 is a schematic overhead view of this assembly.

FIG. 21 is a schematic perspective view of a device to recover the composition of the invention by pressing.

FIG. 22 is an exploded schematic view of a centrifuge recovery device.

Figure 23:
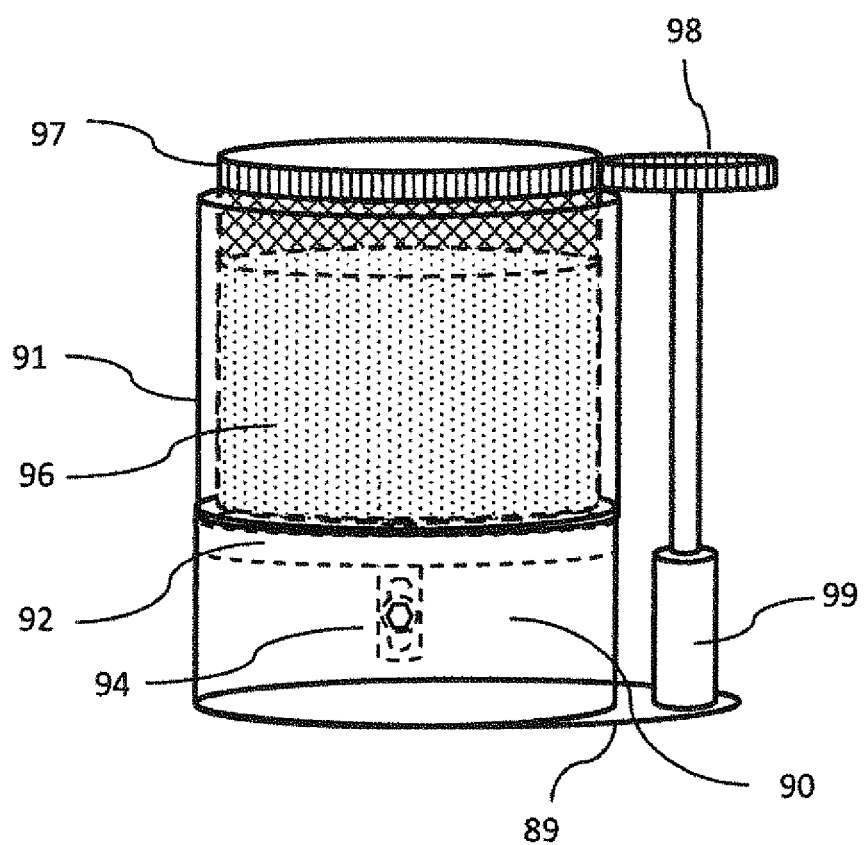

FIG. 23 gives a schematic view of this mounted device.

Figure 1:
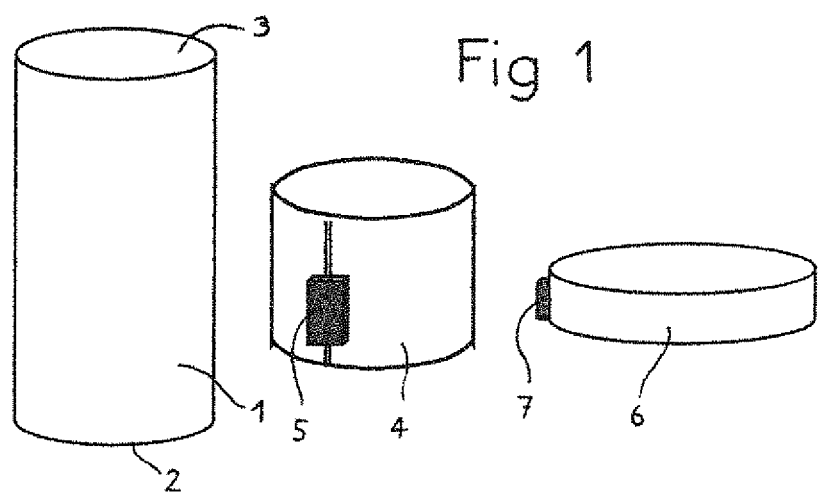
Figure 2:
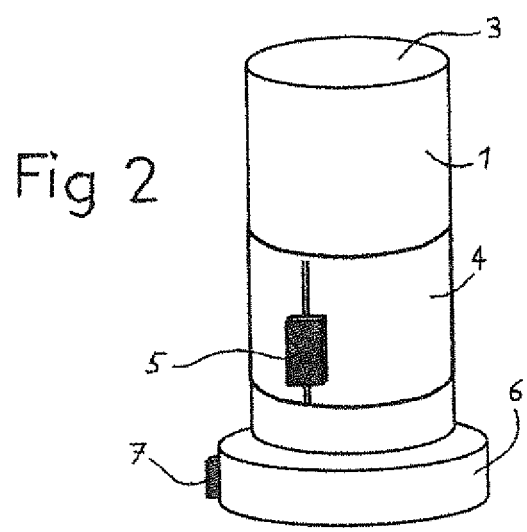

With reference to FIGS. 1 and 2, it can be seen that the device comprises a tank 1, preferably metallic of cylindrical shape with a bottom part 2 and upper opening 3. To heat a volume of tallow placed in the tank 1, the latter in its lower part is surrounded by an electric heating belt 4 of usual type, with an electric power box 5 also comprising a thermostat. The tank 1 is placed on a bottom support 6, also a heating support, with its power box 7 and thermostat. Means (not represented) can also ensure securing to the bottom support. For devices of large size in particular it is advantageous to provide gas heating for self-sufficient operation but another other form of self-heating may be suitable.

Figure 3:
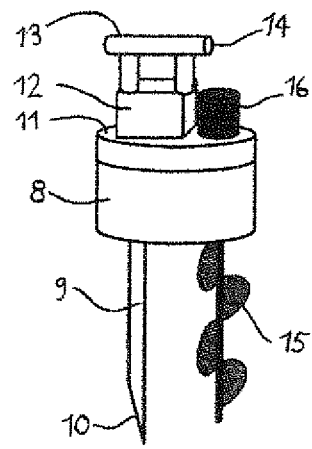
Figure 4:
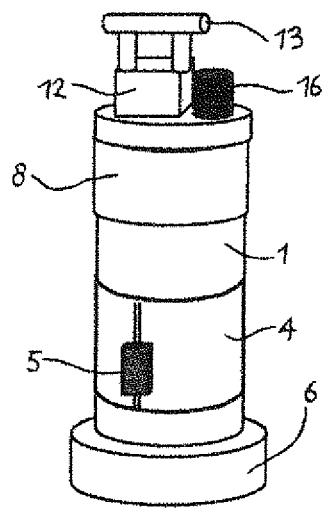

In FIGS. 3 and 4 a lid 8 can be seen of cylindrical shape which can be sealingly positioned by sliding over the top part of the tank 1. This lid 8 has a steel tube 9 bevelled at its lower end 10, which passes through the upper planar part 11 of the lid 8 and leads into a pump 12 fixed thereto and from which there emerges a discharge pipe 13 having a connector end 14.

The lid 8 also carries a spiral agitator 15 extending downwardly parallel to the tube 9 and driven by a motor 16 also fixed to the upper part 11 of the lid. Preferably the motor 16 drives the agitator via a clutch, not illustrated, for mechanical uncoupling should the composition be in solid state or too viscous.

Figure 5:
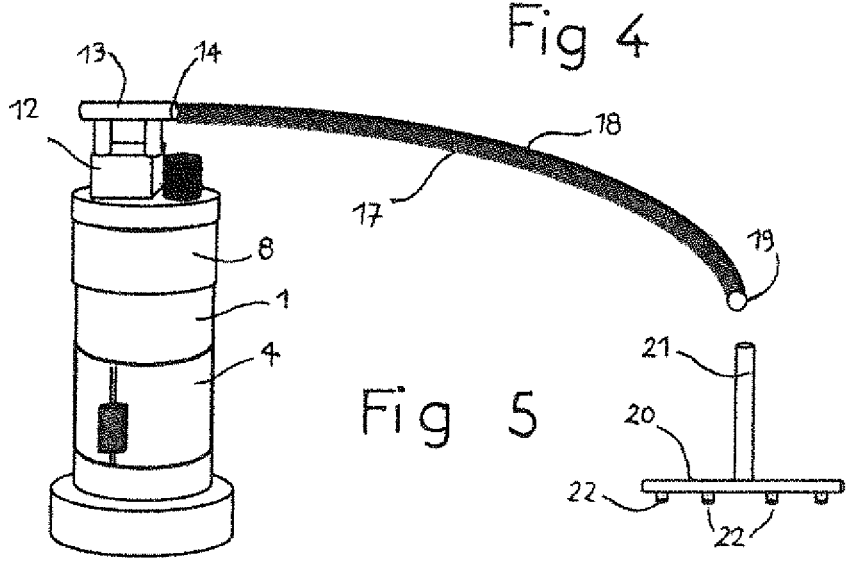

As can be seen in FIG. 5, the connector outlet 14 receives a pressure-resistant flexible tube or conduit 17 along which there extends a heating cable 18 able to be connected to a power source to ensure heating of the tube 17. The assembly formed by the tube 17 and heating cable 18 can also be surrounded by a flexible heat-insulating cladding, not illustrated.

At the other end 19 of tube 17 a tubular pour ramp 20 is connected having a conduit 21 connecting to the flexible tube 17 perpendicular to the ramp itself. The tubular ramp 20 has a plurality of equidistant pour nozzles 22 adapted to pour the hot liquid composition. Preferably the ramp 20 and optionally its central conduit 21 also comprise an electric heating lead or cable, not illustrated, and can optionally be surrounded by a heat-insulating cladding, also not illustrated.

Finally the nozzles 22 are also surrounded by heating means, preferably heating collars.

All these electric heating elements, belts, cables and collars are of usual type and commercially available.

With reference to FIGS. 6 to 8 a heat-insulating jacket 23 can be seen with a bottom part 24 and a hinged semi-cylindrical opening part 25. Once the container formed by the tank 1, its lid and different components are placed inside the enclosure 23, the latter is covered in its upper part with a heat-insulated cover 26 of cylindrical shape with a slit 27 to pass the transfer conduit 17, this cover surmounting the elements carried by the lid 8, such as the pump 12, conduit 13 and agitator motor 16.

Preferably the heat-insulating cover 26 carries a control box 28 for the pump and agitator, this box able to be removably connected via cables and connectors, not illustrated, to corresponding connection means carried by the enclosure lid 8. The cover 26 may also comprise an electric power connector 29 which can be removably connected to electric connection means carried by the lid 8, not illustrated to power the pump 12, motor 16 and optional solenoid valves, not illustrated, for transfer of the liquid composition.

Preferably the enclosure 23 may also comprise an electrical power connector 30 that can be removably connected to the boxes 5 of the heating belt 7 and heating bottom part. This connector 30 may possibly form a box comprising the heat control means.

With reference to FIG. 9 a flat jet nozzle 22 can be seen of usual commercially available type with a screwed portion 32 on the nozzle body 31 allowing adjustment of the spray angle via rotation. A heating collar 33 secured around the nozzle and powered with electric current by a cable 34 allows the nozzle to be kept at the desired temperature.

Figure 11:
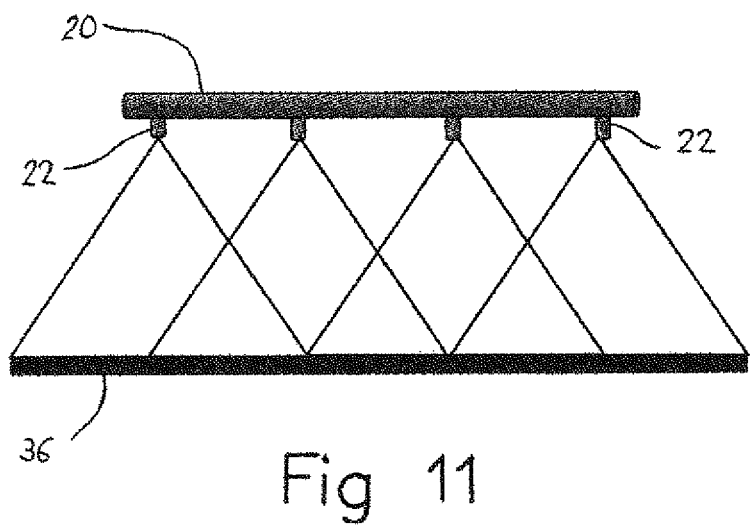

With reference now to FIGS. 10 and 11. FIG. 10 shows a ramp 20 formed of a metal tube having a plurality of nozzles 22 oriented downwardly and positioned every 20 to 60 cm, for example 30 cm. To solidify a thick slick of hydrocarbon 35, for example 0.5 to 60 even 100 mm thick, flat jet nozzles 22 are provided having a spray angle of between 15 and 30° fed with hot liquid composition at a pressure between 3 and 6 bars, the spray angles overlapping at the impact point on the slick 35. The ramp 20 is carried by one or more supports of adjustable height secured to a vehicle or vessel so as to position the ramp at a height of 30 to 100 cm above the slick 35.

For solidification of a slick 36 less thick e.g. a few tenths of a mm to 1 cm, FIG. 11 shows a ramp 20 having nozzles 22 with a spray angle in the order of 80°, these angles overlapping at the slick 36. The ramp may advantageously be positioned at a height of 30 to 50 cm above the slick.

Figure 12:
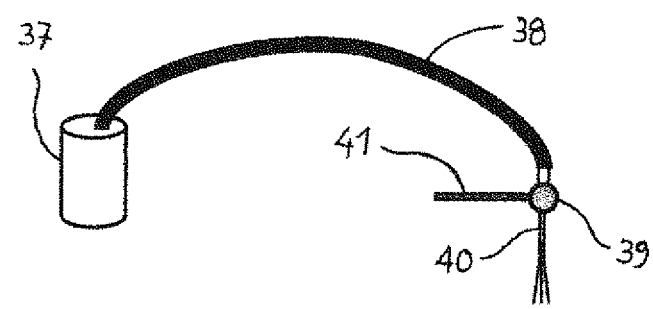

With reference to FIG. 12 a device can be seen to prepare the slick by sprinkling citric acid, comprising a tank 37 of non-heated citric acid, provided with a transfer pump or preferably an air compressor, not illustrated, allowing transfer of the acid under pressure via a flexible conduit 38 towards a ramp 39 shown in profile and having a plurality of nozzles 40 sending very fine jets of acid in downward direction. These nozzles are positioned at intervals of 15 to 30 cm for example, and are supplied at a pressure of between 3 and 6 bars for example. Ramp 39 is secured via one of the securing means 41 to ramp 20 and is height-adjustable independently of ramp 20, for example at a height ranging from 15 cm to 1 m. In addition the acid ramp is preferably also adjustable so that it can be distanced ahead of ramp 20 by a distance ranging from 30 to 60 cm for example.

Therefore ramp 39, parallel to ramp 20, is able to spray onto the polluting slick a curtain of very fine acid jets perforating the slick that is thereby prepared to receive immediately afterwards the sprinkling or spraying of hot liquid composition of the invention.

As a variant, the ramp 39 can be replaced by a ramp of compressed air sending very fine jets in downward direction able to perforate the hydrocarbon slick.

The ramps 20 and associated ramps 39 may be of different length ranging from about ten cm for small-size portable solidification devices up to 6 or 10 m for pollutions of great magnitude. It is also possible to make provision for portable devices only having a single nozzle for the composition, preceded by a short distance by an acid nozzle.

Figure 14:
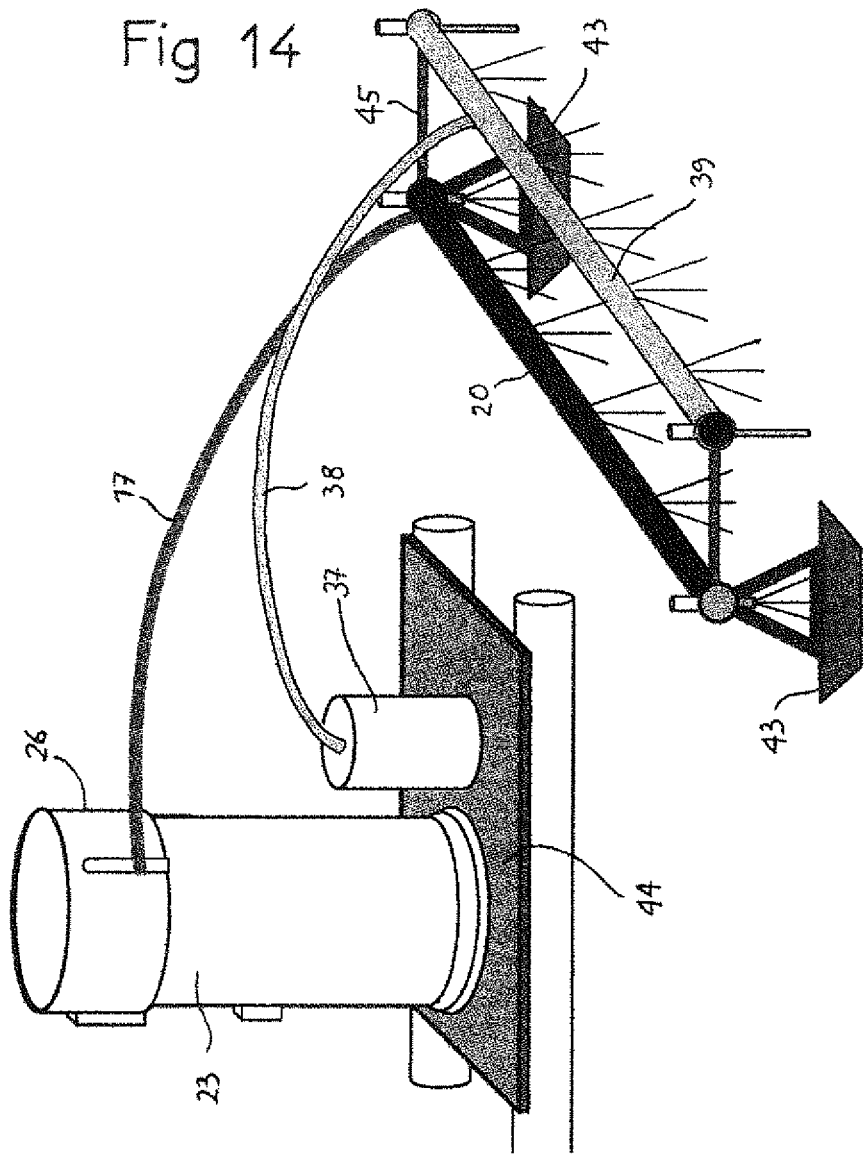
FIG. 14 is a schematic perspective view of this ramp that is part of a remediation assembly to clean a hydrocarbon slick on an aquatic site.

FIGS. 13 and 14 illustrate a ramp 20 of long length e.g. 4 m, formed of a metal tube closed at both ends and having a plurality of equidistant nozzles along its lower edge, this tube carrying a heating cable and preferably heat-insulating cladding from which the nozzles emerge. At these two ends, the ramp 20 is carried at adjustable height by supports e.g. vertical arms 42, themselves secured onto corresponding floats 43.

This assembly is attached in front of the anterior part of a watercraft 44, illustrated in FIGS. 15 and 16, which carries the device to prepare the hot liquid composition with its heat-insulating cladding 23, 26, and is connected to the centre of the tube via a heated, heat-insulated conduit 17. The floats 43, by means of arms 45 and in a position ahead of the ramp 20, may also carry an acid pour ramp 39 having a plurality of fine nozzles, the height of this ramp preferably able to be adjusted independently of ramp 20 and at a distance e.g. 30 to 60 cm in front of the latter in the direction of travel of the craft 44 which pushes this floating assembly e.g. via hinged arms linking the floats 43 to the craft. Ramp 39 is connected by conduit 38 to the pressured acid feed device 37. This ramp 39 may be offset to the rear of ramp 20 when the craft moves in opposite backward direction.

It is not essential for the ramps to be carried by their own floats, but such floats have the advantage of guaranteeing a constant spreading height.

With reference to FIGS. 15 and 16. Recovery of the tallow and solidified polluting liquid can be carried out in a heated tank to liquefy the different materials which then decant and form non-miscible superimposed layers. The pollutant such as liquid hydrocarbon or fatty substance forms a top layer resting on the layer of tallow material solid at ambient temperature, this layer possibly resting on a thin layer of water which could originate from collection of the solid assembly formed using the process of the invention. These layers can then be separated for example using simple aspiration steps. However it is preferred to leave the tank to cool so that said material such as the tallow solidifies, and the overlying liquid layer of pollutant is evacuated for subsequent recovery of the material in solid form.

Advantageously identical elements to those used to manufacture the liquid composition can be used, for example a tank 1 with its heating elements 4 and 6. The tank may also have an outlet tap 46 in its lower part in the event of formation of a thin layer of water. The tank can be closed by a lid 47 similar to lid 8 with or without the agitator 15 and its motor 16 linked by a clutch, the pipe 9 being replaced by a flexible tube 48 to aspirate and evacuate the pollutant.

Preferably the device also comprises cooling means, allowing rapid solidification of the material such as tallow once it has decanted, thereby further facilitating separation thereof. It is possible for example to provide for alternate heating and cooling belts surrounding the tank 1 or interleaved heating and cooling coils with a cold source provided in the base 6 for example.

The re-solidified material can then be evacuated but it is far more preferable to make reuse thereof for a new remediation cycle optionally replacing lid 47 by a lid 8 then heat-insulating the tank so that the material of the composition becomes liquid again, if necessary after addition of the lubricating product.

When the process of the invention is applied to clearing of a slick on an aquatic surface e.g. a river, lake or sea, the recovery or collecting of the solidified complex material floating on the surface can be carried out using any suitable means e.g. a net. The mesh of this net is preferably fairly fine to recover most of the solidified matter whilst allowing good flow-through of water so that material that is substantially water-free can be collected. Preferably the mesh size is between 4 and 10 mm e.g. 5 mm.

With reference to FIG. 17. To simplify the device of the invention it may be advantageous not to use an agitator. The heating tank 1a intended to heat the composition receives a suction tube 13a fitted with a valve 13b and leading to the suction of a pump 12a which discharges the composition towards a discharge tube 13c fitted with a valve 13d allowing transfer of the hot composition under pressure to the conduit 17 feeding the nozzle ramp. A bypass 13e, fitted with valve 13f, alternatively allows discharge of the composition into the tank 1a, and hence homogenization of the composition during its preparation and storage.

With reference to FIG. 18 a preferred example of a net can be seen comprising a rectangular boom 49 filled with air connected to a similar lower boom 50 but filled with water. The rectangular surface inside each boom has a sheet of netting 51, 52, the two booms being connected on three sides of the rectangle by corresponding net walls, 53, 54, 55, the last long side forming the opening side 57 of the net. A cable or cord 58 can be provided to close the opening of the net on completion of collection, the booms then being either deflated or emptied of water respectively after which the net can be drawn up out of the water and emptied into a tank. For example this cable can be guided along anterior sections of the booms 49 and 50, even along anterior edges of the net sides 52, 53 e.g. under loops. The closed net remaining afloat can also be left on site for recovery by another craft.

With reference to FIGS. 19 and 20 a description is given of a device to implement the process for a hydrocarbon slick of large or very large surface area in an aqueous medium on which conversion of the slick to a solid, collection of the solid complex material thus formed, separation of solid tallow from the hydrocarbon at ambient temperature, remanufacture of said composition from said separated material and application of said remanufactured composition are continuously performed together with storage or evacuation of the liquid hydrocarbon.

The assembly comprises a craft with two hulls or floats 59 linked by a bridge 60 of catamaran type, the hulls being spaced apart by a distance of 6 m for example, the craft comprising engine means driving one or more propellers immersed at depth to prevent substantial impact on the slick, usual steering and navigation means, and an electric generator unit. This craft, at the front of the bridge 60, carries two ramps 20 and 39 illustrated in FIG. 14, with their floats and adjusted at the desired heights having regard to the type and thickness of the slick, the whole carrying reference number 61 and supplied via their respective conduits carrying general reference number 62. These ramps are connected to the bridge 60 via two hinged arms 63.

The bridge 60 carries a device 64 to manufacture the heated liquid composition, for example of the type described in FIG. 1 to 8 or 17, to feed spray ramp 20 and a device, not illustrated, to feed ramp 39 incorporating a citric acid tank of large volume.

The bridge also carries a device 65 to recover animal fat material namely tallow and solidified liquid pollutant e.g. of the type illustrated in FIGS. 15 and 16, this device able to extract tallow preferably still in liquid form from layer 66 for transfer thereof preferably periodically via conduit 67 to a heated intermediate tank 68 feeding device 64 preferably periodically with already liquid material via conduit 69. The hydrocarbon layer 70 is evacuated via conduit 71 towards a hydrocarbon tank or receiving container 72.

The clumps or solid aggregates of complex material formed by application of the composition of the invention and floating between the two hulls of the craft are collected by collection means 73 and discharged into the tank of the recovery device 65. These collection means may be of various types e.g. a bucket chain of which the buckets, not illustrated, have a bottom grating to allow evacuation of the water collected with the material whilst the material is retained as the buckets are lifted, or simply a slightly angled conveyor belt 74, preferably gridded optionally provided at regular intervals with retaining cross-pieces or simply having on its outer surface sufficient roughness to prevent large blocks or fragments from rolling downwards, the lower end of the belt being immersed to receive the solidified complex material.

These collection means may extend over the entire distance of the bridge between both floats, but it is also possible to use a much narrower collection device preferably positioned in the centre of the bridge 59, making provision for two partly immersed deflectors 75 converging towards the centre and towards the rear to guide the solidified slick towards the collection device 73 in similar manner to a funnel.

At the rear of the craft it is also possible to provide for a net 76 e.g. of the type described for FIG. 18, to collect residual fragments not recovered by the collection device 73. Two deflectors 77 can be provided to centre these fragments in the direction of the net 76.

Finally, it is also possible to make provision for two outer lateral deflectors 78 to guarantee that the non-treated parts of the polluting slick adjacent to the outer side edges of the floats are not directed towards the net 76.

The craft also comprises engine means with one or more propellers immersed several metres deep, steering means, powering means preferably electric to drive the different mobile devices in particular the circuit pumps, agitation means, collection device and in general all useful accessories. For heating of the tanks it is preferable to use gas heating means.

It is therefore possible with a reasonable amount of material, namely tallow, to treat slicks extending over considerable surface areas in the event of major pollutions. It may then be preferred to perform the preparation step of the slick using jets of compressed air and/or mechanical blades to avoid too much acid consumption bearing in mind that for fairly fluid or scarcely thick hydrocarbon pollutions the composition of the invention can be applied directly without preparation of the slick. The amount of composition to be applied to the slick may generally be 0.05 a 0.25 litre of composition per 1 square metre of slick for pollution of an aqueous surface such as river, lake or sea.

With reference to FIG. 21 showing a tallow recovery device by pressing the collected complex material of tallow and solidified hydrocarbon. It comprises a parallelepiped tank 79 in resistant material e.g. steel the bottom 80 of which rests on a base 81 and the top part is open. The tank 79 at the bottom is provided with a drain pipe 82 having a valve (not illustrated). The two long vertical surfaces of the tank on their inner side have two ridges 83 parallel to the bottom. These ridges can support the frame of a very fine wire mesh filter 84 that slides into position via a side opening 85 onto the ridges 83. Preferably a seal plate 85 slides underneath the filter 84, this plate possibly also being withdrawn when the filter is in place in the tank 79. A compression plate 86 can be placed in the tank via its open top and moved sealingly downwards by means of sealing liners (not illustrated) arranged on its four edges. The base carries a motor device 87 e.g. a jack cylinder carrying an arm 88 used to push the compression plate 86 downwards.

When the filter 84 is positioned in the tank 79 with the underlying seal plate 85, a mass of solid complex material of tallow and hydrocarbon is placed in the tank above the filter, the compression plate 86 in the tank is brought to above this mass and the mass is heated to softening temperature e.g. 37° C. Plate 85 is removed and the cylinder 87 is actuated to push plate 86 downwards under strong pressure. The hydrocarbon is seen to flows progressively through the filter into the bottom of the tank 79 where it can be withdrawn via conduit 82. On completion of compression, there remains a cake of tallow above the filter 84 containing less than 1% hydrocarbon. This cake is removed either mechanically or by heating the tank to above 48° C. to liquefy the tallow that can then be drawn off e.g. by passing through the filters 84 and evacuating via pipe 82. The recovered tallow can be reused to solidify and collect a further quantity of polluting hydrocarbon or fatty substance.

With reference to FIGS. 22 and 23 a centrifuge can be seen to recover a tallow composition of the invention. On a base 89 it comprises a lower fixed cylindrical tank 90 on which an upper fixed cylindrical tank can be arranged the bottom of which is formed by a removable circular plate 92 provided with a central passageway 93 extended by a short central duct 94 provided with a draining valve 95. The device comprises a rotor 96 forming a cylindrical basket preferably having multiple perforations both in the bottom part and in its cylindrical surface. This rotor is able to rotate inside the tank 91 about a vertical axis common to the assembly being guided, as is usual, by ball bearings (not illustrated) inserted between the bottom of the rotor and the upper surface of the plate 92. On the top surface of the rotor 96 there is removably attached a toothed disk 97 meshing with a toothed wheel 98 driven by a motor assembly 99 secured to the base 89.

A mass of solid complex material is placed in the rotor 96, the toothed disk 97 is attached to the rotor and the rotor is placed in the tank 96 attached to plate 92. The mass is heated to softening point between 30 and 38° C., and the rotor is rotated in the tank e.g. at 300 rpm, whilst opening valve 95. It is ascertained that the mass of material in the rotor 96 comes to lie against the inner surface of the cylindrical wall of the rotor and even passes through the rotor towards the inner cylindrical wall of the tank 91, opening up a free central volume in the rotor, whilst the hydrocarbon is extracted from the mass and flows centrally downwards through the central perforations in the bottom of the rotor and through duct 94 to be recovered in the lower tank 90 from which it can be drawn off via a pipe not illustrated. On completion of centrifugation, the mass of recovered tallow is found in the rotor and tank 91, the recovered mass containing a small amount of hydrocarbon. This mass is recovered either mechanically or preferably by heating the assembly to above the tallow melting point allowing liquid tallow to be received in the bottom tank 90 after draining the hydrocarbon.

As examples, the processes of filtering under pressure and centrifugation each allowed tallow containing less than 1% of pollutant to be recovered from materials comprising spent engine oil of density 0.855, milk of density 1.050 or diesel oil of density 0.850.

The invention claimed is:

1. A process to convert substantially liquid hydrocarbons or fatty substances to solid form, for the remediation of surfaces or sites polluted with these hydrocarbons or fatty substances, comprising contacting the matter to be converted to solid form with a composition in the liquid state comprising ovine or bovine tallow at least in majority proportion and optionally a fluidizing agent, thereby obtaining a solid complex material, the liquid state of said composition being obtained by heating said composition to a temperature of at least 45° C., wherein immediately before said contacting, the matter to be solidified is pretreated to improve the distribution of said composition within the matter, said pretreatment comprising sprinkling said matter to be solidified with an acid, the volume of said acid being 10% or lower of the total volume of composition used, said pretreatment being carried out in a zone at a short distance ahead of the zone in which the matter to be solidified is contacted with the composition in liquid form, and wherein said acid is a short-chain organic acid.

2. The process according to claim 1 wherein an excess amount of composition is poured onto the matter to be solidified, said amount being at least two times higher than the amount needed to solidify a quantity of hydrocarbon or fatty substance, the formed solid mixture is collected then heated to a liquid, and the treated mixture is poured onto another quantity of the matter to be solidified, another solid mixture is formed is collected and optionally this operation is renewed one or more times if the mixture last formed is capable, once heated and poured, of solidifying a further quantity of matter to be solidified.

3. The process according to claim 1, wherein the proportion of fluidizing agent is 5% by weight or less.

4. The process according to claim 3, wherein the proportion by volume of said ovine or bovine tallow relative to the total composition is at least 75%.

5. The process according to claim 3, wherein the proportion of fluidizing agent is in the range of 1 to 2% by weight.

6. The process according to claim 1 further comprising the recovering of solid material at ambient temperature from the solid complex material comprising tallow and hydrocarbon or fatty substance obtained using the process according to claim 1, wherein said complex material is heated to softening temperature of the tallow in the material and the material is subjected to pressing against a filter or to centrifugation to separate the liquid hydrocarbon or fatty substance from the softened tallow.

7. The process according to claim 6, wherein said softening temperature is 30 to 38° C.

8. The process according to claim 6, wherein the proportion by volume of said tallow relative to the total composition is at least 90%.

9. The process according to claim 1, wherein the converting of said substantially liquid hydrocarbon or fatty substance material to solid form via pouring of said composition, collecting of said solid complex material thus formed, separation at least of the tallow from the collected hydrocarbons or fatty substances, re-manufacture of said composition from said separated material and pouring of said re-manufactured composition are carried out continuously.

10. The process according to claim 1 wherein said composition is heated at a temperature of 45 to 55° C.

11. The process according to claim 1, wherein the pretreatment further comprises jetting compressed gas onto the matter to be solidified and/or mechanical separating said matter to be solidified.

12. A process to recover solid material at ambient temperature from a solid complex material comprising tallow and hydrocarbon or fatty substance obtained using the process according to claim 1, wherein said complex material is heated to a temperature equal to or higher than the melting point of the tallow in the composition, after which said tallow is separated.

13. A remediation process via solidification according to claim 1 of a substantially liquid hydrocarbon or fatty substance material in a slick on a site, for remediation of this site, wherein an amount of composition comprising tallow and optionally a fluidizing agent, heated to the liquid state, is poured to the slick to bring the composition in contact with the slick at a large number of points or even over the continuity of the treated surface of the slick, the solid complex material thus formed is collected and optionally at least the tallow is separated, by heating, from the hydrocarbons or fatty substances derived from the slick.

14. The process according to claim 13, wherein an amount of composition comprising tallow and optionally a fluidizing agent ranging from 0.05 to 1litre, is poured per slick square metre of hydrocarbon or fatty substance.

* * * * *